E. G. MEADWAY.
SCREEN FOR MOVING AND OTHER PROJECTED PICTURES.
APPLICATION FILED MAR. 4, 1915.
1,216,154.   Patented Feb. 13, 1917.
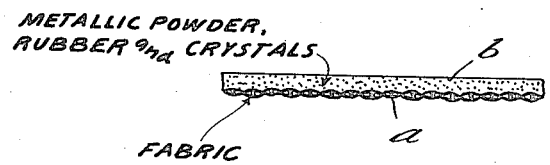

UNITED STATES PATENT OFFICE.

ERNEST GEORGE MEADWAY, OF LONDON, ENGLAND, ASSIGNOR TO THE BRITISH PATENT SURBRITE COMPANY LIMITED, OF LONDON, ENGLAND.

SCREEN FOR MOVING AND OTHER PROJECTED PICTURES.

1,216,154.   Specification of Letters Patent.   Patented Feb. 13, 1917.

Application filed March 4, 1915. Serial No. 12,089.

*To all whom it may concern:*

Be it known that I, ERNEST GEORGE MEADWAY, a subject of the King of Great Britain, residing in London, England, have invented certain new and useful Improvements in Screens for Moving and other Projected Pictures, of which the following is a specification.

This invention relates to screens of the kind used for receiving cinematographic and like projected pictures and has for its object to produce such a screen whereon the luminous projections will, by reason of the reflecting nature of its surface, be particularly sharp and clear.

The accompanying drawing represents a sectional view of a portion of a screen constructed according to this invention, wherein *a* indicates a backing of fabric such as canvas, or of other suitable material, which is provided with a reflecting surface. The surface may be formed by coating the front or that side of the material which is to receive the projected picture with one or more layers *b* of a liquid mixture containing a metallic powder suspended in, and a crystalline substance dissolved in, a solution of india rubber and naphtha or other suitable evaporative vehicle.

Any suitable crystallizable salt which is soluble in the vehicle used, but which is capable of reflecting light and will recrystallize on evaporation, may be employed to form the mixture. The purpose of the recrystallized salt is to break up the rays of light falling upon the screen so that they may be diffused evenly, thus enabling a clear and undisturbed picture to be reflected from the screen, and be equally visible without shadows from any point of view. As a suitable crystallizable salt, naphthalene crystals may be used, and an appropriate mixture may comprise naphthalene crystals, nickel powder and india rubber dissolved in naphtha. The proportion in which the ingredients are mixed is dependent on the actual elements used and on the quality of rubber employed. A mixture containing the above-mentioned ingredients in the following proportions has been found to produce very satisfactory results, viz: 2 lbs. of nickel powder, $\frac{3}{4}$ lb. of chemically pure naphthalene crystals, and sufficient rubber solution to make 1 gallon of mixture, the rubber solution being composed of $2\frac{3}{4}$ ounces of rubber to 1 gallon of naphtha.

Having thus described the nature of the said invention and the best means I know of carrying the same into practical effect, I claim:—

1. A screen of the character described, comprising a backing of suitable material and a reflective coating on a surface thereof, said coating consisting of reflecting metallic powder, rubber and a crystalline substance, the latter being such as is capable of reflecting light and will dissolve in and recrystallize from a volatile solvent containing rubber in solution and employed with respect to the other components in such proportion that on recrystallizing the crystals will cover practically the whole of the surface.

2. A screen of the character described, comprising a backing of suitable material and a reflective coating on a surface thereof, said coating consisting of nickel powder, india-rubber and naphthalene crystals, the latter being with respect to the other components of such proportion that they cover practically the whole of the surface.

3. A screen of the character described, comprising a backing of suitable material and a reflective coating on a surface thereof, said coating consisting of nickel powder, india-rubber and naphthalene crystals in substantially the proportions stated.

In testimony whereof I have signed my name to this specification in the presence of two subscribing witnesses.

ERNEST GEORGE MEADWAY.

Witnesses:
C. S. HOPKINS,
W. J. SKERTEN.